United States Patent
Lee et al.

(10) Patent No.: US 9,292,914 B2
(45) Date of Patent: Mar. 22, 2016

(54) DEVICE FOR MEASURING CRITICAL DIMENSION OF PATTERN AND METHOD THEREOF

(71) Applicant: Samsung Display Co., Ltd., Yongin-si, Gyeonggi-do (KR)

(72) Inventors: Young Suk Lee, Hwaseong-si (KR); Yong Jun Park, Yongin-si (KR); Jong Soo Lee, Asan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 105 days.

(21) Appl. No.: 14/207,273

(22) Filed: Mar. 12, 2014

(65) Prior Publication Data
US 2015/0098643 A1    Apr. 9, 2015

(30) Foreign Application Priority Data

Oct. 8, 2013  (KR) .......................... 10-2013-0119971

(51) Int. Cl.
*G06K 9/00*   (2006.01)
*G06T 7/00*   (2006.01)

(52) U.S. Cl.
CPC .............. *G06T 7/001* (2013.01); *G06T 7/0006* (2013.01); *G06T 2207/10061* (2013.01); *G06T 2207/30148* (2013.01)

(58) Field of Classification Search
CPC .................... G06T 7/001; G06T 2207/30148; G06T 7/0006; G06T 2207/10061
See application file for complete search history.

(56) References Cited

U.S. PATENT DOCUMENTS

| | | | |
|---|---|---|---|
| 7,274,820 B2 * | 9/2007 | Mitsui .................. | G06T 7/0004 382/145 |
| 7,559,047 B2 * | 7/2009 | Miyamoto .......... | G03F 7/70625 382/144 |
| 7,668,373 B2 * | 2/2010 | Mitsui .................... | G06K 9/48 382/181 |
| 2002/0159053 A1 * | 10/2002 | Nair .................... | G01N 21/8806 356/237.2 |
| 2008/0118852 A1 | 5/2008 | Mitsuhashi | |
| 2009/0202140 A1 * | 8/2009 | Mitsui ................. | G06K 9/4604 382/145 |
| 2010/0136717 A1 * | 6/2010 | Shin ....................... | H01J 37/241 438/14 |
| 2010/0158389 A1 * | 6/2010 | Mitsui .................. | G03F 7/7065 382/199 |
| 2012/0105617 A1 | 5/2012 | Yoon et al. | |

FOREIGN PATENT DOCUMENTS

KR          10-0548722 B1     1/2006
KR      10-2008-0069326 A     7/2008

* cited by examiner

*Primary Examiner* — Samir Ahmed
(74) *Attorney, Agent, or Firm* — Knobbe, Martens, Olson & Bear, LLP

(57) ABSTRACT

A device and method for measuring a critical dimension of a pattern on a display substrate is disclosed. In one aspect, the device includes a region of interest (ROI) setting unit setting a region of interest in image data, determining whether the region of interest is larger than a reference region, and generating a pattern image based on the region of interest. The device also includes a design file memory storing a plurality of design patterns, a matching unit matching the pattern image to one of design patterns, and a measurement unit measuring the critical dimension of the pattern in the pattern image. The ROI setting unit selects the image data as the pattern image and outputs the pattern image to the matching unit when the region of interest is larger than the reference region.

10 Claims, 12 Drawing Sheets

PTN #1 -1

PTN #1 -2

PTN #1 -3

⋮

DEVICE FOR MEASURING CRITICAL DIMENSION OF PATTERN AND METHOD THEREOF

CROSS-REFERENCE TO RELATED APPLICATIONS

This application claims priority to and the benefit of Korean Patent Application No. 10-2013-0119971 filed in the Korean Intellectual Property Office on Oct. 8, 2013, the entire contents of which are incorporated herein by reference.

BACKGROUND

1. Field

The described technology generally relates to a device for measuring a critical dimension of a pattern formed on a substrate and a method thereof.

2. Description of the Related Technology

In the manufacturing of semiconductor devices, it is essential to precisely measure fine patterns which can be formed on a substrate by various processes, such as photolithography, etching, and the like. An electrical characteristics test or a measurement of a critical dimension of the fine pattern can be indispensable in confirming whether or not the fine pattern is formed within the required tolerances during the manufacturing process.

For example, a scanning electron microscope (SEM) is used for measuring a line width (critical dimension (CD)). Herein, the critical dimension refers to the minimum space between two lines or a minimum circuit line width which is acceptable in the manufactured semiconductor device. The critical dimension is a specified value for the spatial limitations between interconnected lines of the semiconductor device and the width of a line itself.

SUMMARY OF CERTAIN INVENTIVE ASPECTS

One inventive aspect is a device for measuring a critical dimension of a pattern capable of creating or modifying a design pattern without directly measuring a physical substrate and a method thereof.

Another aspect is a device for measuring a critical dimension of a pattern, including an region of interest (ROI) setting unit setting a region of interest in image data and determining whether the region of interest is larger than a reference region, a design file storage unit in which a plurality of design patterns are stored. a matching unit matching a pattern image with the plurality of design patterns, and a measurement unit measuring the critical dimension of the pattern in the pattern image, in which when the region of interest is larger than the reference region, the image data may be transferred to the matching unit and the image data may become the pattern image for measuring the critical dimension of the pattern.

The device for measuring a critical dimension of a pattern may further include a preprocessing unit performing preprocessing on the pattern image.

When the region of interest is smaller than the reference region, the image data may be transferred to the preprocessing unit and among the image data, the region of interest may become the pattern image which is preprocessed by the preprocessing unit.

The preprocessing unit may remove noise from the pattern image.

The device for measuring a critical dimension of a pattern may further include: a binarization unit binarizing the pattern image.

The device for measuring a critical dimension of a pattern may further include: a region detection unit detecting a pattern region in the pattern image.

The region detection unit may detect an area occupied by the pattern in the pattern image.

The region detection unit may detect the number of pixels occupied by the pattern in the pattern image.

Another aspect is a method of measuring a critical dimension of a pattern, including setting a region of interest in image data, determining whether the region of interest is larger than a reference region, determining the image data as a pattern image when the region of interest is larger than the reference region, determining the region of interest as the pattern image when the region of interest is smaller than the reference region, and measuring the critical dimension of the pattern in the pattern image.

The method of measuring a critical dimension of a pattern may further include performing preprocessing on the pattern image.

The method of measuring a critical dimension of a pattern may further include when the image data are determined as the pattern image, matching the image data with a plurality of design patterns, in which when the image data match any one of the plurality of design patterns, the performing of the preprocessing on the pattern image may be performed.

The method of measuring a critical dimension of a pattern may further include determining a design pattern matching error when the image data do not match the plurality of design patterns.

The method of measuring a critical dimension of a pattern may further include registering design pattern data after the design pattern matching error is determined.

The registering of the design pattern data may include inputting a design file, converting the design file into image data, selecting a matching region in the image data, and extracting the matching region as one design pattern.

The performing of the preprocessing may include removing noise from the pattern image.

The method of measuring a critical dimension of a pattern may further include performing binarization on the pattern image after the preprocessing is performed.

The method of measuring a critical dimension of a pattern may further include detecting the pattern region in the pattern image after the binarization is performed.

The detecting of the pattern region may include detecting an area occupied by the pattern in the pattern image.

The detecting of the pattern region may include detecting the number of pixels occupied by the pattern in the pattern image.

The measuring of the critical dimension of the pattern in the pattern image may include detecting the critical dimension of the pattern by counting the number of pixels of the pattern in a vertical direction of a length direction of the pattern.

Another aspect is a device for measuring a critical dimension of a pattern formed on a display substrate, the device comprising: a region of interest (ROI) setting unit configured to: i) receive image data from an external source, ii) set a region of interest in the image data, iii) determine whether the region of interest is larger than a reference region, and iv) generate a pattern image based at least in part on the region of interest; a design file memory storing a plurality of design patterns; a matching unit configured to match the pattern image to one of the design patterns; and a measurement unit configured to measure the critical dimension of the pattern in the pattern image, wherein the device is further configured to select the image data as the pattern image when the region of interest is larger than the reference region.

The above device further comprises a preprocessing unit configured to preprocess the pattern image. In the above device, the ROI setting unit is further configured to select the region of interest as the pattern image and output the pattern image to the preprocessing unit when the region of interest is smaller than the reference region. In the above device, the preprocessing unit is further configured to remove noise from the pattern image. The above device further comprises a binarization unit configured to convert the pattern image to a black and white image. The above device further comprises a region detector configured to measure a pattern region in the pattern image. In the above device, the region detector is further configured to measure the area occupied by the pattern in the pattern image. In the above device, the region detector is further configured to count the number of pixels occupied by the pattern in the pattern image.

Another aspect is a method of measuring a critical dimension of a pattern on a display substrate, the method comprising: setting a region of interest in image data; determining whether the region of interest is larger than a reference region; selecting the image data as a pattern image when the region of interest is larger than the reference region; selecting the region of interest as the pattern image when the region of interest is smaller than the reference region; and measuring the critical dimension of the pattern in the pattern image, wherein at least one of the setting, the determining, the selecting of the image data, the selecting the region of interest, or the measuring is performed by a computing device.

The above method further comprises preprocessing the pattern image. The above method further comprises: matching the image data to one of a plurality of design patterns when the region of interest is larger than the reference region, wherein the preprocessing of the pattern image is performed when the image data matches one of the design patterns. The above method further comprises determining a design pattern matching error has occurred when the image data does not match any of the design patterns. The above method further comprises storing new design pattern data when it is determined that the design pattern matching error has occurred. In the above method, the storing of the new design pattern data includes: generating a design file; converting the design file into new image data; selecting a matching region in the new image data; and extracting the matching region as the new design pattern.

In the above method, the preprocessing includes removing noise from the pattern image. The above method further comprises converting the pattern image to a black and white image after the preprocessing. The above method further comprises detecting a pattern region in the pattern image after the converting of the pattern image. In the above method, the detecting includes measuring the area occupied by the pattern in the pattern image. In the above method, the detecting includes counting the number of pixels occupied by the pattern in the pattern image. In the above method, the measuring includes counting the number of pixels of the pattern in a direction substantially perpendicular to the length direction of the pattern in the pattern image.

Another aspect is a device for measuring a critical dimension of a pattern formed on a display substrate, the device comprising: a region of interest (ROI) setting unit configured to: i) receive image data, ii) set a region of interest in the image data, and iii) generate a pattern image based at least in part on the region of interest; a design file unit including a memory that stores a plurality of design patterns; and a matching unit configured to match the pattern image to one of the design patterns, wherein the design file unit is configured generate a new design pattern and store the new design pattern in the memory when the pattern image does not match any of the design patterns.

In the above device, the ROI setting unit is further configured to i) determine whether the region of interest is larger than a reference region and ii) select the image data as the pattern image and output the pattern image to the matching unit when the region of interest is larger than the reference region.

According to at least one embodiment, it is possible to newly write or modify the measurement recipe by using the design pattern data without the actual substrate.

DETAILED DESCRIPTION OF CERTAIN INVENTIVE EMBODIMENTS

Figure 1:
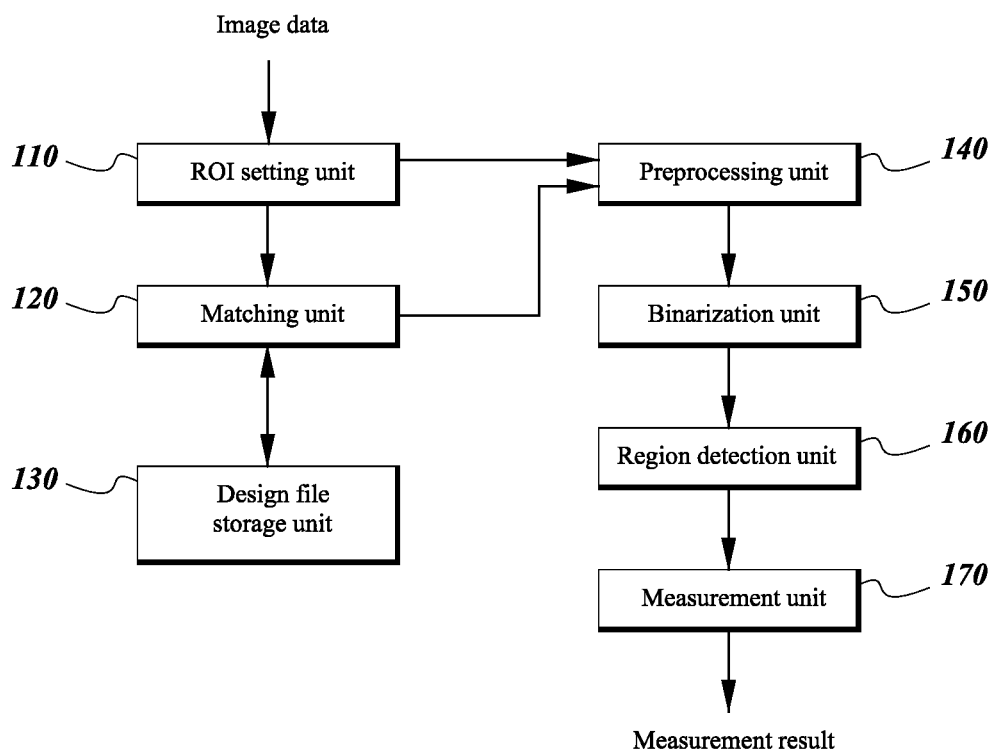
FIG. 1 is a block diagram illustrating a device for measuring a critical dimension of a pattern according to an exemplary embodiment.

The standard method of measuring a pattern includes a measurement recipe depending on the characteristics of the measured pattern. This method includes measuring the critical dimension of a pattern on the actual substrate including the pattern. The measurement of the critical dimension of the pattern depends on the provided measurement recipe. In order to create a new measurement recipe or modify an existing recipe, the physical substrate including the patterns is required. When the actual substrate on which the patterns are formed is not available, it is impossible to create or modify a measurement recipe.

In the following detailed description, only certain exemplary embodiments have been shown and described, simply by way of illustration. As those skilled in the art would realize, the described embodiments may be modified in various different ways, all without departing from the spirit or scope of the described technology Further, in the exemplary embodiments, since like reference numerals designate like elements having the same configuration, a first exemplary embodiment is representatively described, and in other exemplary embodiments, only those configurations different from the first exemplary embodiment will be described.

Portions of the technology irrelevant to the description will be omitted to clearly describe the described technology, and the same elements will be designated by the same reference numerals throughout the specification.

Throughout this specification and the claims that follow, when it is described that an element is "coupled" or "connected" to another element, the element may be "directly coupled" or "directly connected" to the other element or "electrically coupled" or "electrically connected" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram illustrating a device for measuring a critical dimension of a pattern according to an exemplary embodiment.

Referring to FIG. 1, a device 100 for measuring a critical dimension of a pattern includes a region of interest (ROI) setting unit 110, a matching unit 120, a design file storage unit or a design file memory 130, a preprocessing unit or a preprocessor 140, a binarization unit 150, a region detection unit or a region detector 160, and a measurement unit 170. At least one of the elements 110-170 can be implemented by hardware such as a computing device or a controller. The device 100 can be used for manufacturing or testing a flat panel display such as an organic light-emitting diode (OLED) display or a liquid crystal display (LCD).

The ROI setting unit 110 receives image data from an optical test device (not illustrated). The optical test device may include an optical microscope, such as a scanning electron microscope. The ROI setting unit 110 sets a region of interest (ROI) in the image data. The ROI setting unit 110 may measure the profile of the pattern in the image data. The ROI setting unit 110 may determine an optimal turning point for the profile of the pattern and set the region of interest from the optimal turning point. The region of interest is a region in which patterns to be measured may be included.

The ROI setting unit 110 determines whether the region of interest is larger than a reference region. The reference region may be the optimal region in which an optical test device may acquire an image with a single photograph. The ROI setting unit 110 transfers the image data to the preprocessing unit 140 when the region of interest is smaller than the reference region. The region of interest may be transferred to the preprocessing unit 140 as a pattern image for measuring the critical dimension of the pattern when the region of interest is smaller than the reference region.

The ROI setting unit 110 transfers the image data to the matching unit 120 when the region of interest is larger than the reference region. The image data becomes the pattern image for measuring the critical dimension of the pattern.

The matching unit 120 matches the pattern image with a design pattern stored in the design file storage unit 130. The design file storage unit 130 stores a plurality of design patterns. The matching unit 120 may search for the design pattern included in the stored design patterns which match the pattern image. When the pattern image matches the design pattern, the matching unit 120 transfers the image data to the preprocessing unit 140.

The preprocessing unit 140 performs preprocessing on the pattern image. The preprocessing of the pattern image is a process of removing noise included in the pattern image. The preprocessed pattern image is transferred to the binarization unit 150.

The binarization unit 150 binarizes the pattern image. The binarized image is a black and white image without grayscale. The binarized pattern image is transferred to the region detection unit 160.

The region detection unit 160 measures the pattern region in the pattern image. The pattern region may be measured as the area occupied by the pattern in the pattern image. Alternatively, the pattern region may be measured as the number of pixels occupied by the pattern in the pattern image.

The measurement unit 170 measures the critical dimension of the pattern in the pattern image. The measurement unit 170 divides the area occupied by the pattern by an average length in a length direction of the pattern in order to measure an average critical dimension of the pattern. Alternatively, the measuring unit 170 divides the total number of pixels occupied by the pattern by the number of pixels in the length direction of the pattern in order to measure the average critical dimension of the pattern. Alternatively, the measurement unit 170 counts the number of pixels of the pattern in a direction perpendicular to the length direction of the pattern in order to measure the critical dimension of the pattern.

Hereinafter, a method of measuring the critical dimension of a pattern by using the device 100 will be described.

Figure 2:
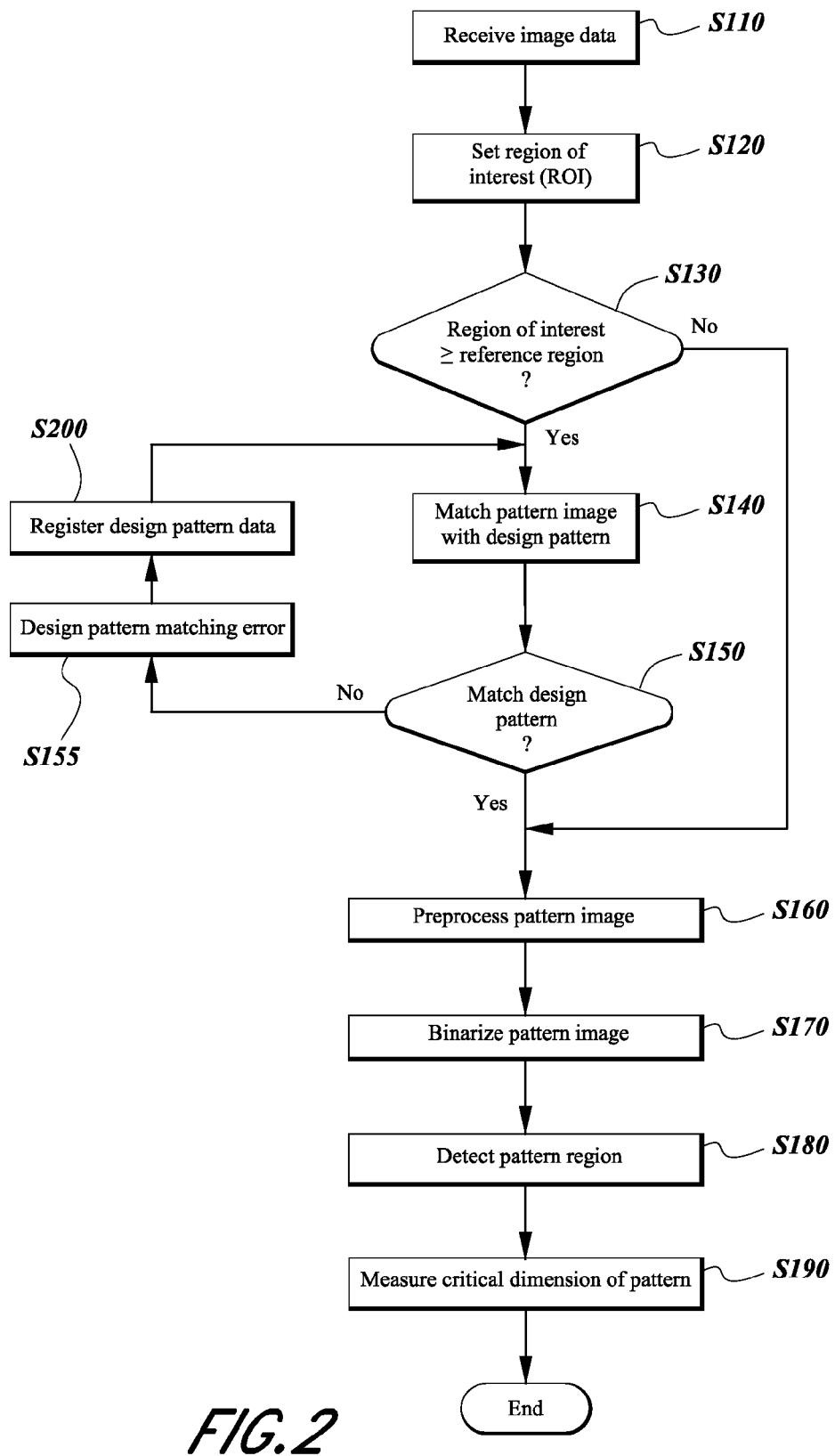
FIG. 2 is a flow chart illustrating a method of measuring a critical dimension of a pattern according to an exemplary embodiment.
Figure 7:
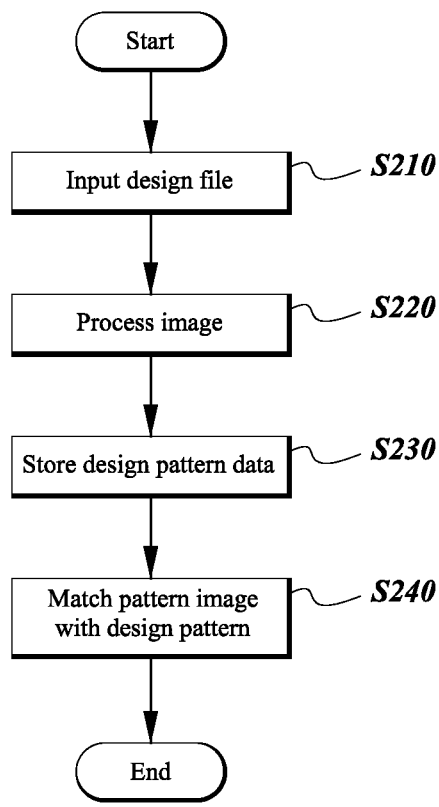
FIG. 7 is a flow chart illustrating the registering of design pattern data according to an exemplary embodiment.

FIG. 2 is a flow chart illustrating a method of measuring a critical dimension of a pattern according to an exemplary embodiment of the present invention. In some embodiments, the process of FIG. 2 is implemented in a conventional programming language, such as C or C++ or another suitable programming language. The program can be stored on a computer accessible storage medium of the device 100, for example, the design file storage unit 130. In certain embodiments, the storage medium includes a random access memory (RAM), hard disks, floppy disks, digital video devices, compact discs, video discs, and/or other optical storage mediums, etc. The program may be stored in a processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor can execute applications with the assistance of operating systems such as Unix, Linux, Microsoft DOS, Microsoft Windows 7/Vista/2000/9x/ME/XP, Macintosh OS, OS/2, Android, iOS and the like. In another embodiment, at least part of the procedure can be implemented with embedded software. Depending on the embodiment, additional states may be added, others removed, or the order of the states changed in FIG. 2. The description of this paragraph also applies to the procedure of FIG. 7.

Referring to FIGS. 2 to 6, the image data is received from the optical test device (S110). For example, a primary electron is irradiated onto a semiconductor substrate such as a wafer or a reticle and scanning is performed by using the scanning electron microscope. The image data of the pattern is then acquired by detecting a secondary electron discharged from the pattern on the substrate. The image data acquired by the scanning electron microscope is transferred to the ROI setting unit 110.

The region of interest (ROI) is set in the image data (S120). A profile of the pattern may be measured in the image data and the region of interest may be set using the profile of the pattern. For example, the optimal turning point for the profile of the pattern may be determined and the region of interest may be set from the optimal turning point.

Next, it is determined whether the region of interest is larger than the reference region (S130). The reference region may be the optimal region in which the optical test device may acquire an image with a single photograph, in which the reference region may be, for example, about 100 um². When the region of interest is smaller than the reference region, the region of interest may be selected as the pattern image for measuring the critical dimension of the pattern. When the region of interest is larger than the reference region, the image data may be selected as the pattern image for measuring the critical dimension of the pattern.

When the region of interest is larger than the reference region, a process of matching the pattern image of the image data with the design pattern is performed (S140). The design file storage unit 130 stores a plurality of design patterns and the design pattern matching the pattern image of the image data is searched for.

It is determined whether the pattern image of the image data matches the design pattern (S150). When the pattern image matches the design pattern at a defined ratio or greater in consideration of process deviations, it may be determined that the pattern image matches the design pattern. For example, when the pattern image matches the design pattern with a 75% or greater match, it may be determined that the pattern image matches the design pattern.

When the pattern image of the image data does not match the design pattern, it is determined that a design pattern matching error has occurred (S155). When the pattern image of the image data does not match the design pattern, the design pattern corresponding to the pattern image is not in the design file storage unit 130.

When the design pattern is not in the design file storage unit 130, the design pattern corresponding to the pattern image is updated in the design file storage unit 130.

When the design pattern matching error occurs, a process of registering design pattern data is performed (S200). The process of registering design pattern data is a process of updating the design pattern corresponding to the pattern image and may be performed by an operator of the device 100 for measuring a critical dimension of a pattern. The description thereof will be described below with reference to FIG. 7.

Figure 3:
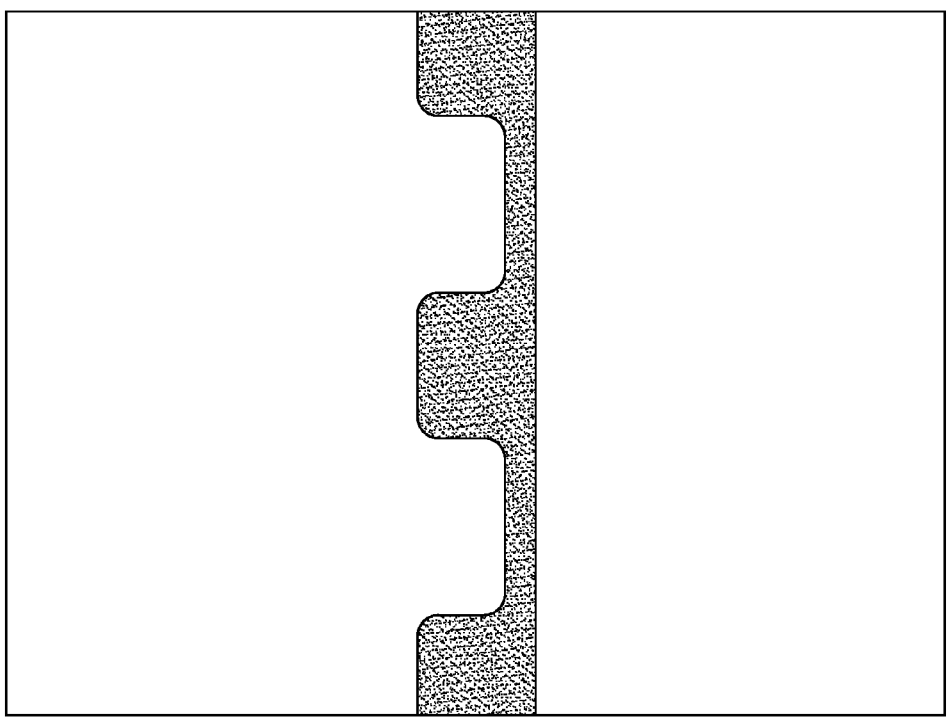
FIG. 3 is a diagram illustrating a pattern image for explaining the preprocessing of the pattern image according to an embodiment.

The preprocessing of the pattern image is performed after the pattern image has been selected when the region of interest is smaller than the reference region or the pattern image has been selected when the region of interest is larger than the reference region (S160). The noise included in the pattern image is removed by the preprocessing of the pattern image. As illustrated in FIG. 3, the pattern image becomes a gray pattern image in which spots and the like are removed by preprocessing the pattern image.

Figure 4:
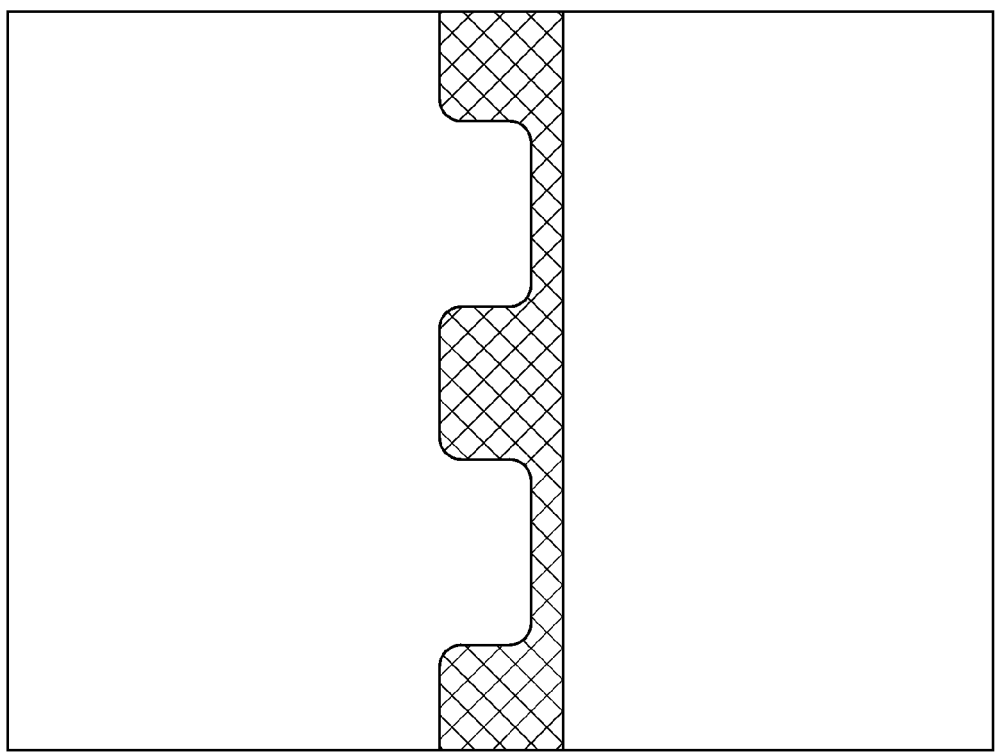
FIG. 4 is a diagram illustrating a pattern image for explaining the binarizing of the pattern image according to an embodiment.

The preprocessed pattern image is binarized (S170). As illustrated in FIG. 4, the pattern image becomes a monochrome pattern image by binarizing the pattern image.

Figure 5:
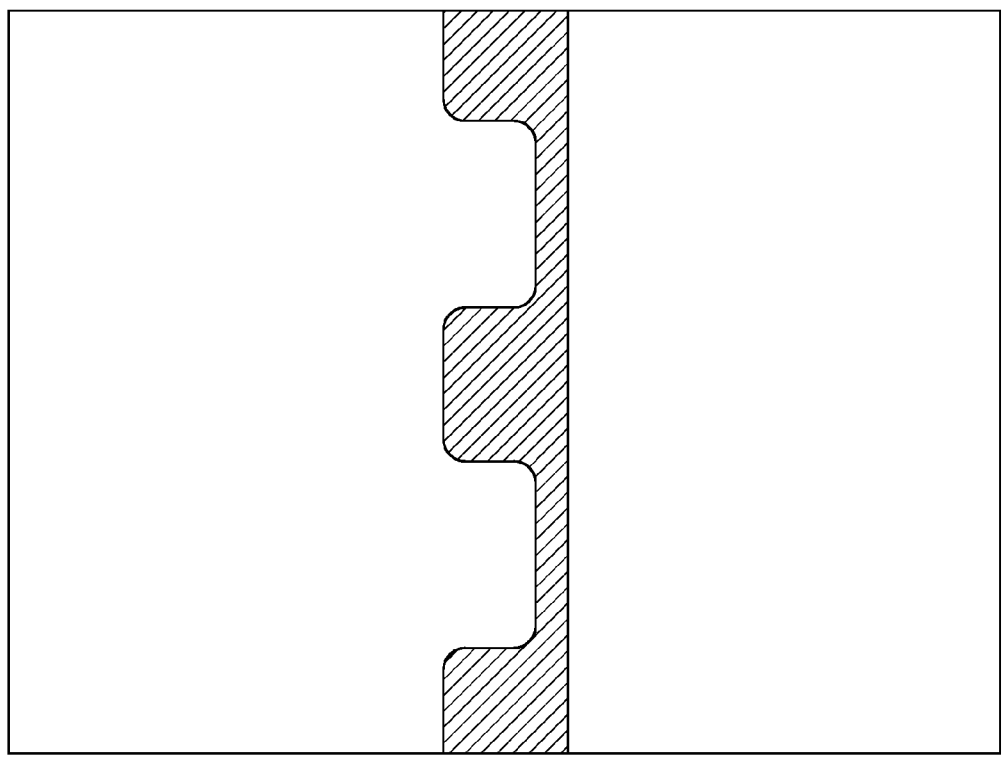
FIG. 5 is a diagram illustrating the pattern image for explaining the detecting of a region of the pattern image according to an embodiment.

The pattern region is measured from the binarized pattern image (S180). The pattern region may be measured as an area occupied by the pattern in the pattern image or by the number of pixels. As illustrated in FIG. 5, the pattern region may be measured by measuring the area of the region which is converted into white by the binarization process or the by counting the number of pixels occupied by the white region.

Figure 6:
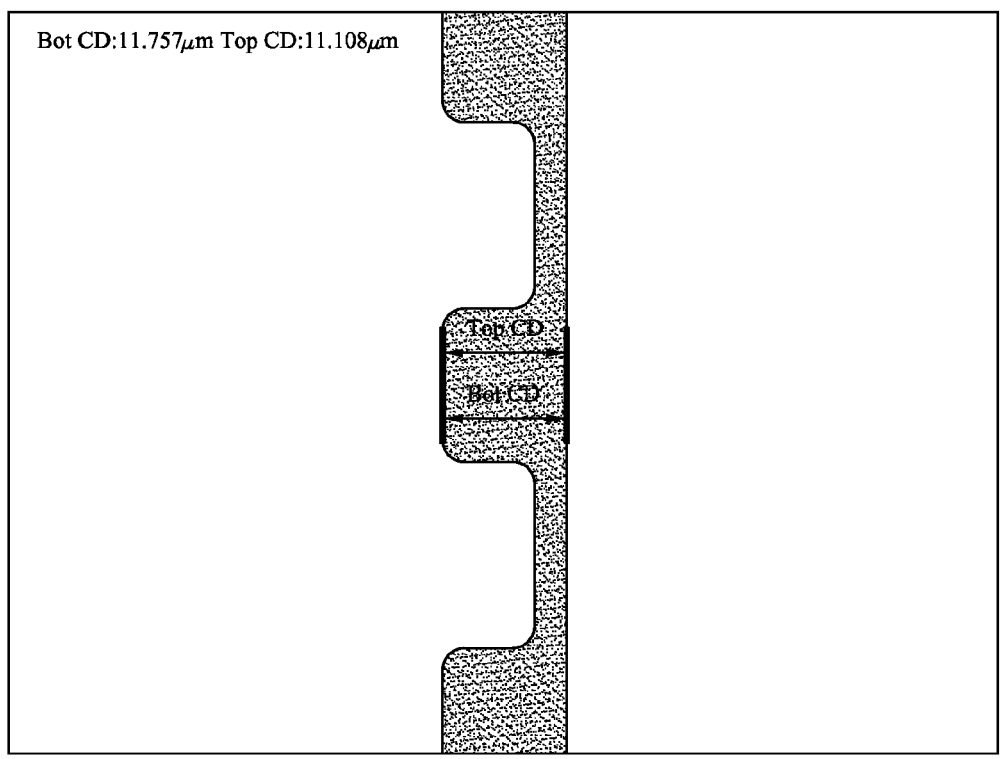
FIG. 6 is a diagram illustrating the pattern image for explaining the measuring of a critical dimension of a pattern according to an embodiment.

After the pattern region is measured in the pattern image, the critical dimension of the pattern is measured (S190). The average critical dimension of the pattern may be measured by dividing the area occupied by the pattern by the average length in the length direction of the pattern. Alternatively, the average critical dimension of the pattern may be measured by dividing the total number of pixels occupied by the pattern by the number of pixels in the length direction of the pattern. The critical dimension of the pattern may also be measured by counting the number of pixels of the pattern in the direction perpendicular to the length direction of the pattern. As illustrated in FIG. 6, the critical dimension of the pattern may be measured as a bottom critical dimension Bot CD and a top critical dimension Top CD of the pattern. FIG. 6 illustrates an embodiment in which the lower critical dimension Bot CD of the pattern and the upper critical dimension Top CD of the pattern are measured. In other embodiments, the line width roughness, the uniformity of multi-line width, and the like may be measured by a process of measuring a critical dimension of a pattern.

Hereinafter, the process of registering the design pattern data in the design file storage unit 130 will be described.

Figure 8:
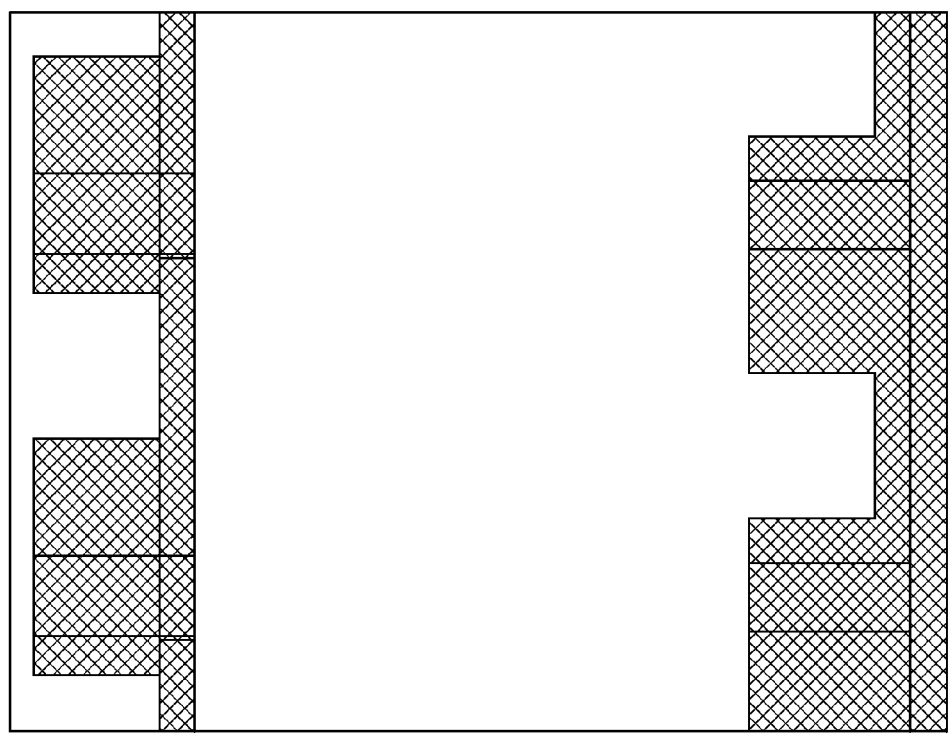
FIG. 8 is a diagram illustrating a design file according to an exemplary embodiment.

Referring to FIGS. 7 to 12, a design file is generated and input to the design file storage unit 130 (S210). As illustrated in FIG. 8, the design file may be a graphic design system (GDS) file which illustrates the patterns formed on the substrate.

The design file storage unit 130 performs image processing on the design file (S220). The image processing may include converting the design file into image data, selecting a matching region, a binarization process, and the like.

Figure 9:
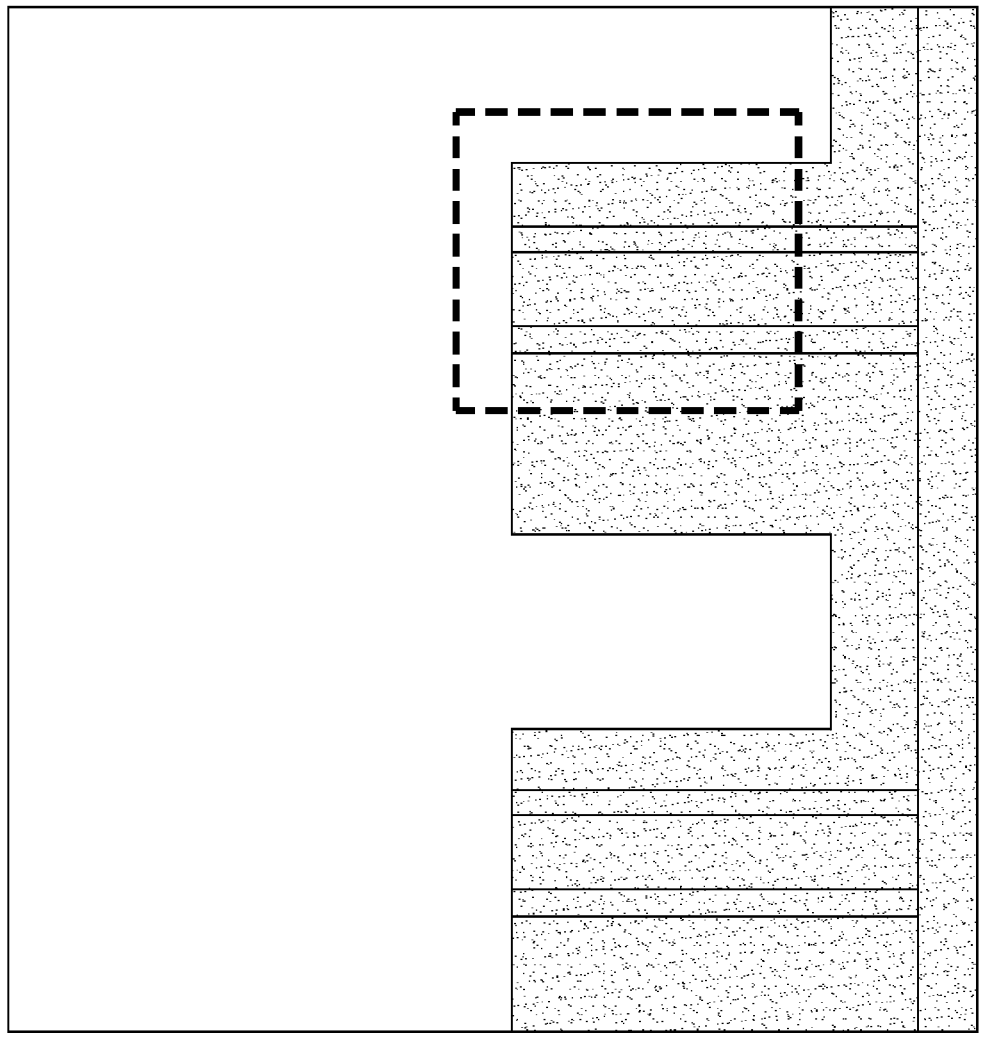
FIG. 9 is a diagram illustrating a matching region of a design pattern in a design file for explaining the processing of an image of a design file according to an embodiment.

The design file storage unit 130 may convert the design file into image data, measure the profile of the pattern in the image data, and then select the matching region using the profile of the pattern. A method of selecting the matching region may be performed similar to the setting of the region of interest in the ROI setting unit 110. For example, the optimal turning point for the profile of the pattern may be determined and the matching region may be set from the optimal turning point. As illustrated in FIG. 9, a portion in which the pattern is bent forming a corner in the image data becomes the optimal turning point and the matching region (dotted line quadrangular region) may be set based on the optimal turning point. In the embodiment shown in FIG. 9, one matching region is selected based on one optimal turning point. According to some embodiments, a plurality of optimal turning points are included in the image data and a plurality of matching regions are selected based on the optimal turning points. Alternatively, one matching region may also be selected based on the optimal turning points.

Figure 10:
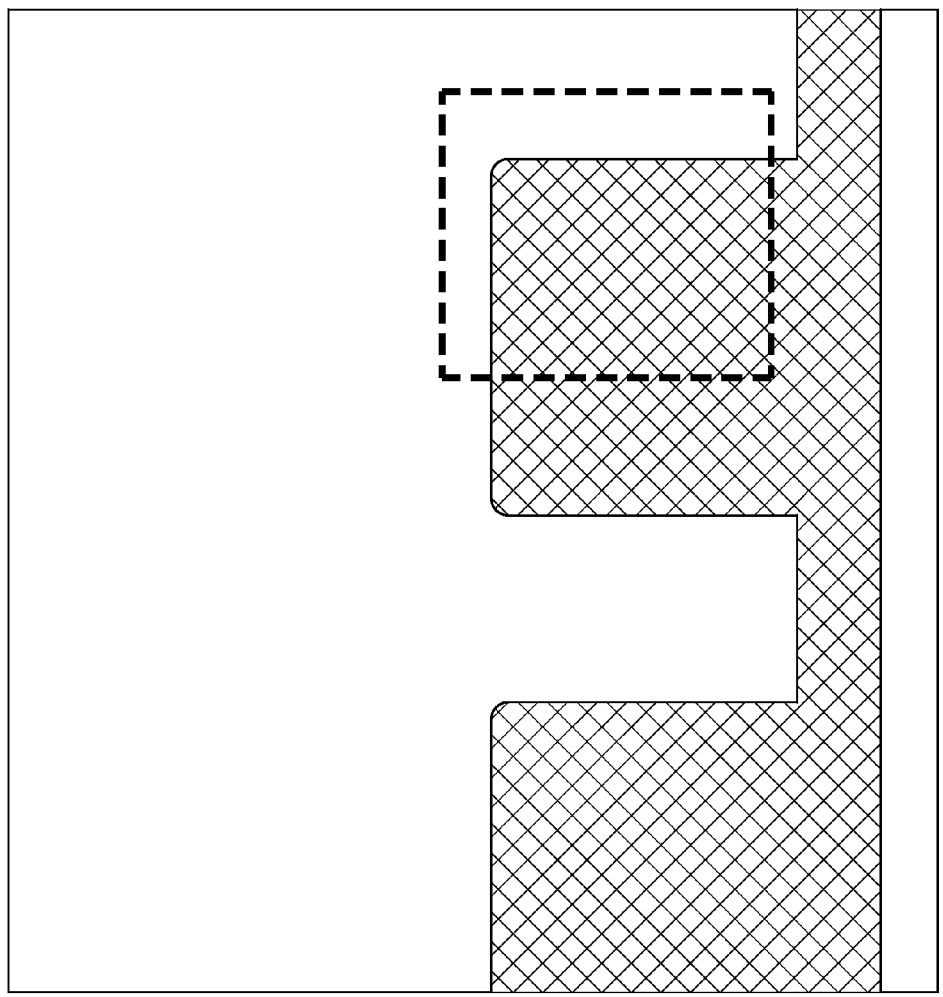
FIG. 10 is a diagram illustrating a binarization image of the design patterns for explaining the processing of an image of a design file according to an embodiment.
Figure 11:
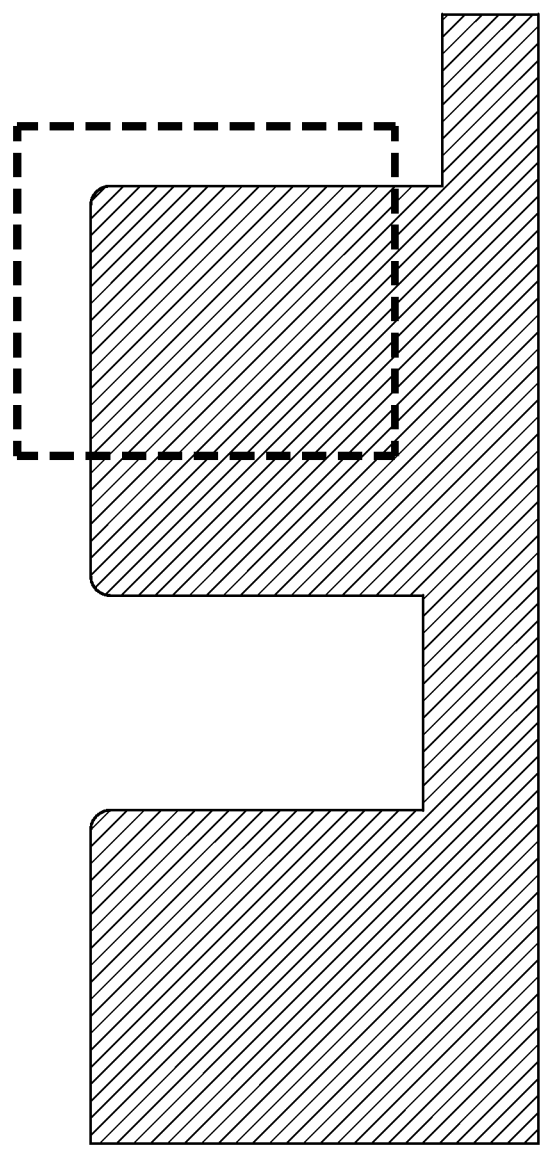
FIG. 11 is a diagram illustrating a binarization image of a design pattern for explaining the processing of an image of a design file according to an embodiment.

The design file storage unit 130 binarizes the image data in order to convert the image data into monochrome image data. As illustrated in FIG. 10, the pattern region may be converted into white and a peripheral area may be converted into black. Alternatively, as illustrated in FIG. 11, the pattern region may be converted into black and a peripheral area may be converted into white.

The design file storage unit 130 extracts the matching region as the design pattern from the processed image data and stores the extracted design pattern as the design pattern data (S230).

Figure 12:
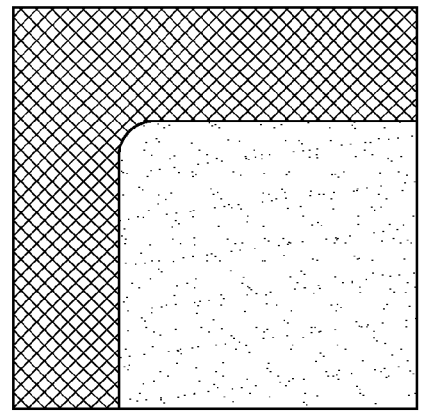
FIG. 12 is a diagram illustrating an example of the design pattern stored by the processing an image of a design file according to an embodiment.
Figure 12:
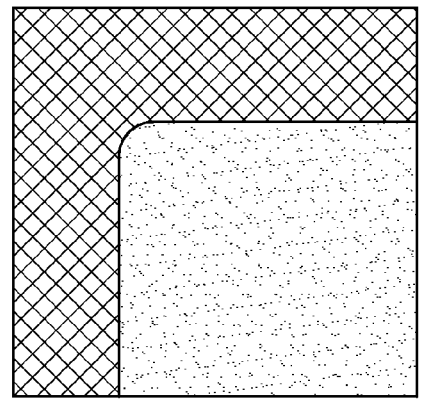
Figure 12:
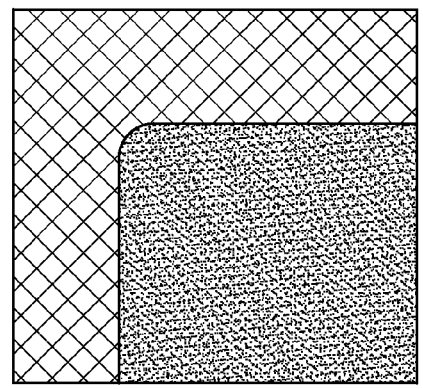

The design file storage unit 130 stores the design patterns extracted from the design files. As described above, this process includes inputting a design file (S210), processing an image (S220), and storing design pattern data (S230). As illustrated in FIG. 12, the matching regions extracted from the design files may be stored as design patterns PTN#1-1, PTN#1-2, PTN#1-3, . . . .

Since the method of selecting the matching region in the design file is performed similar to the method of setting the region of interest, the pattern image set as the region of interest in the semiconductor pattern produced to meet the standards of the design file may accurately match the design pattern extracted from the corresponding design file.

After the design pattern is stored in the design file storage unit 130, the process of matching the pattern image acquired from the real substrate with the design pattern is performed (S240). This may correspond to the process of matching the pattern image with the design pattern (S140) described in FIG. 2. That is, when the pattern image does not match the design pattern and thus a design pattern matching error occurs, after registering and matching new design pattern data, the matching process (S140) may be performed again.

As described above, the design patterns extracted from the design files are stored and matching of the pattern image acquired from the predetermined substrate is performed. Therefore, there is no need to write or modify a measurement recipe by using an actual substrate each time the type of substrate to be measured is changed.

The accompanying drawings and the detailed description include illustrations and descriptions by way of example only and are not to be interpreted as limiting of the scope of the described technology. Accordingly, it will be understood by those of skill in the art that various changes in form and details may be made without departing from the spirit and scope of the present invention as set forth in the following claims.

What is claimed is:

1. A device for measuring a critical dimension of a pattern formed on a display substrate, the device comprising:
    a region of interest (ROI) setting unit configured to: i) receive image data from an external source, ii) set a region of interest in the image data, iii) determine whether the region of interest is larger than a reference region, and iv) generate a pattern image based at least in part on the region of interest;
    a design file memory storing a plurality of design patterns;
    a matching unit configured to match the pattern image to one of the design patterns; and
    a measurement unit configured to measure the critical dimension of the pattern in the pattern image,
    wherein the device is further configured to select the image data as the pattern image when the region of interest is larger than the reference region.

2. The device of claim 1, further comprising a preprocessing unit configured to preprocess the pattern image.

3. The device of claim 2, wherein the ROI setting unit is further configured to select the region of interest as the pattern image and output the pattern image to the preprocessing unit when the region of interest is smaller than the reference region.

4. The device of claim 2, wherein the preprocessing unit is further configured to remove noise from the pattern image.

5. The device of claim 2, further comprising a binarization unit configured to convert the pattern image to a black and white image.

6. The device of claim 5, further comprising a region detector configured to measure a pattern region in the pattern image.

7. The device of claim 6, wherein the region detector is further configured to measure the area occupied by the pattern in the pattern image.

8. The device of claim 6, wherein the region detector is further configured to count the number of pixels occupied by the pattern in the pattern image.

9. A device for measuring a critical dimension of a pattern formed on a display substrate, the device comprising:
    a region of interest (ROI) setting unit configured to: i) receive image data, ii) set a region of interest in the image data, and iii) generate a pattern image based at least in part on the region of interest;
    a design file unit including a memory that stores a plurality of design patterns; and
    a matching unit configured to match the pattern image to one of the design patterns,
    wherein the design file unit is configured generate a new design pattern and store the new design pattern in the memory when the pattern image does not match any of the design patterns.

10. The device of claim 9, wherein the ROI setting unit is further configured to i) determine whether the region of interest is larger than a reference region and ii) select the image data as the pattern image and output the pattern image to the matching unit when the region of interest is larger than the reference region.

* * * * *